United States Patent [19]
Dennon

[11] 4,359,677
[45] Nov. 16, 1982

[54] LINEAR INDEXER

[76] Inventor: Jack D. Dennon, Box G, Warrenton, Oreg. 97146

[21] Appl. No.: 239,627

[22] Filed: Mar. 2, 1981

[51] Int. Cl.$^3$ ............................................. G05B 11/00
[52] U.S. Cl. ................................... 318/687; 318/254; 318/653
[58] Field of Search .............. 318/127, 162, 653, 687, 318/129, 254 A

[56] References Cited

U.S. PATENT DOCUMENTS

| | | | |
|---|---|---|---|
| 3,546,549 | 12/1970 | Burnett | 318/162 |
| 3,681,669 | 8/1972 | Ayers | 318/254 A |
| 3,885,165 | 5/1975 | Franks et al. | 318/162 X |
| 4,242,608 | 12/1980 | Ishigafi et al. | 318/254 A |
| 4,272,710 | 6/1981 | Duill et al. | 318/653 X |
| 4,296,365 | 10/1981 | Yoshikawa | 318/162 X |

OTHER PUBLICATIONS

Profit Pro 2 (Brochure) from United Machine Control, Eugene, Oregon.
A86 Servoactuators, data sheet 860 380 from Moog Inc., East Aurora, New York.
Handbook for Applying Hall Effect Sensors, pub. Microswitch, Freeport, Illinois, 1976.
Single Axis Control Stations, data sheet 130 980, from Moog Inc., East Aurora, New York.

*Primary Examiner*—B. Dobeck

[57] ABSTRACT

Mechanically programmable hydraulic linear positioner providing a primemover with the ability to assume and maintain accurately any of an arbitrary number of preselected programmed positions, and to quickly reposition the load from one such preselected detent position to another detent position upon command. A Hall effect magnetic field sensor detects load position and generates command signals directly controlling a proportional hydraulic valve. Rotary and manual positioning applications are described.

2 Claims, 6 Drawing Figures

LINEAR INDEXER

BACKGROUND OF THE INVENTION

1. Field of the Invention

This invention relates to load positioners used in automatic production machinery and specifically to apparatus for positioning sawmill lumber manufacturing machine elements such as saws, fences, and guides.

2. Description of the Prior Art

In a sawmill, the means most often used for controllably and repeatably positioning saws, fences, guides, alignment lights, and so on, is the binary stack of bottoming pneumatic cylinders. For example, the series head-to-toe stack of four cylinders having individual throws of $\frac{1}{8}''$, $\frac{1}{4}''$, $\frac{1}{2}''$, and $1''$, would be capable of setting to within $\frac{1}{8}''$ of any position within a $1\frac{7}{8}''$ total range.

By adding more cylinders to the stack, the total range may be extended, or the resolution may be improved, at least in theory. Generally it has been impractical to use cylinders with throw shorter than 1/16".

A digital electronic circuit typically is used to generate from a single operator switch closure, the multitude of electrical signals—two per cylinder—required to command the valves that in turn control extension and retraction of individual cylinders. At the instant that a broadside set command is applied to the valves, the net transient motion produced can be momentarily directed away from the new target instead of toward it, if a long cylinder in the stack is faster setting than one or more of the shorter cylinders in the stack. In some applications, such erratic or false motion is not tolerable.

The practical limit of resolution experienced with bottoming cylinders has been about 1/16". The repeatable realization of this resolution requires continuous attention to the tightness of the many mechanical connections in the stack, and also to elimination of the tendency toward buckling of the long stack under load.

More recently, highly accurate setworks have been fabricated using a single hydraulic cylinder in place of the long stack of air cylinders. The single cylinder is controlled by a proportional electrically controlled valve, that is, a valve though which the flow of hydraulic oil is proportional to the electric current through a coil which is a part of the valve mechanism. The current through the coil is in turn controlled by a computer which constantly tracks the position of the object whose position is being controlled, and makes appropriate decisions as to the magnitude and direction of coil current to be applied.

The people at Elworthy Company in Vancouver BC in Canada, manufacture a setworks that is based on moving a magnet past a sensor. Their sensor is a sensitive reed switch, and the axis of their magnet is at right angles to the direction of motion. Their setworks, called the "Dynaset," also uses a miniature stack of bottoming cylinders to position the sensor—not the load—and in practice it achieves repeatable sets to within 1/16" to $\frac{1}{8}''$. The Dynaset uses an on-off type of hydraulic valve to control a single hydraulic cylinder. It is not capable of operating a proportional valve.

The present practice of skilled setworks designers is to use a single hydraulic cylinder as primemover under control of a proportional servo valve such as a MOOG model 62, which is in turn under control of a microcomputer; with load position being sensed by a digital rotary or linear incremental encoder, or by an absolute position transducer of the echo-ranging type. The incremental encoder offers greater intrinsic accuracy independent of range, while the absolute transducer offers greater immunity to the practical problems associated with noise and referencing. Although resolution of 0.010" is in practice adequate for sawmill positioners, marketing considerations have caused designers currently to strive to exhibit a resolution of 0.001".

When using an incremental encoder, the computer or an auxilary circuit must count the pulses generated to keep track of the position of the load. The maximum speed with which the cylinder may be moved must be limited such that the pulse rate generated has a maximum frequency sufficiently lower than the frequency of ambient electrical noise, so that such noise can be identified and ignored.

When using echo-ranging, unless target overshoot is acceptable, the cylinder slew speed must again be limited such that the average of, for example, the most recent ten soundings is a sufficiently accurate representation of the actual instantaneous load position. With a Temposonic transducer, for example, the averaging technique is essential if resolution better than about 0.010" is required over a 24" range. Thus each technique of the current practice involves cylinder slew speed limitations.

The microcomputer offers the designer and the user a range of flexibility that is in principle nearly unlimited. For example, a microcomputer based setworks will in principle be capable of positioning the load anywhere within the range of its cylinder to within 0.010" of an arbitrary target. Flexibility is however a two-sided feature. Greater flexibility is inevitably accompanied by greater probability of miss-sets. In other words, the reliability of the machine is reduced by its flexibility.

In summary, the current state of the art in sawmill setworks is well represented by the single hydraulic cylinder with built-in absolute position transducer, or built-in incremental encoder, coupled with a microcomputer acting as controller. Examples of absolute transducer types are the MOOG A86 Servo-actuators, and the "Accu-Set" cylinder manufactured by United Machine and Control. An example of the incremental type is the "Inovec" manufactured by Fluid Air Components, Inc.

Microcomputer based setworks are expensive to program, require setup and maintenance skills not generally found in sawmills, and intrinsically exhibit failure modes avoidable by simpler, less flexible equipment.

3. Objects of the Invention

One purpose of the present invention is to secure the advantages of the single hydraulic cylinder operating as primemover, and the accuracy realizeable with the proportional valve operating in a self-regulating closed loop, while eliminating the computer.

Another purpose of the present invention is to eliminate the limitation of coarse resolution that is inherent in the use of bottoming cylinders, and while retaining comparable simplicity, achieve continuous setability, or in other words, infinite resolution in principle.

Another purpose of this invention is to provide a setworks that can be set up for use and also have its "sets" modified or adjusted by a person using basic mechanical skills as opposed to requiring attention of a person having electronic or computer related skills.

Another object of my invention is to provide a setworks whose accuracy is independent of slew speed.

Another object of the present invention is to provide a setworks of reduced complexity and to thereby secure improved reliability.

Another object of my invention is to provide a basic method of magnetic control signal creation that can be applied under a variety of conditions to achieve simplified solutions to the problems of automatic and manual positioning of production machinery, as will be more evident in the following specification.

SUMMARY OF THE INVENTION

In my setworks, a Hall sensor—or Hall generator as it is alternatively called—is used to create the electrical signal that is applied to the hydraulic control valve. The well-known Hall effect element produces a voltage that is algebraically proportional to the incident magnetic field. The Hall voltage changes polarity when the magnetic field reverses direction. By setting the magnetic axis of a thin magnet parallel to the direction of sensor motion, the direction of the magnetic field incident upon the sensor reverses direction when the sensor passes along a straight path near the magnet. This signal thus exhibits a null which when suitably amplified, can be applied directly to a proportional valve without need of further processing.

The detent is created by the specific orientation of the sensor relative to the magnet. The face of the Hall generator is parallel to the magnetic axis of the magnet. At the null, the sensitive axis of the Hall generator, that is, the normal to the face of the Hall generator, is at a right angle to the direction of the magnetic flux incident upon the Hall generator. The Hall voltage is greatest, however, when the direction of the magnetic flux is normal to the face of the Hall sensor, and so most applications of Hall sensors are found to depend for their operation on a magnetic flux pattern that is essentially normal in direction to the face of the Hall sensor. Indeed many Hall sensor applications are found to employ pole pieces on the magnet and sometimes on the sensor specifically to concentrate the flux and direct it along the normal axis of the sensor. So prevalent is the notion of Hall generator utility being primarily in normal flux configuration, that heretofore the opportunity has gone unnoticed for creating a usefully sharp null by sensing magnetic flux that is essentially directed parallel to the face of the Hall generator.

By mounting the sensor in a fashion that directly connects its motion to the load being positioned, the current through the valve coil will be zero only when the sensor—and therefore the load—occupies a null as determined by the location of the magnet. Each magnet thus defines the location of a detent, maintainable under substantial dislocating load without external assistance. To relocate the load from one such magnetically defined detent to another, it is sufficient to temporarily override the signal from the sensor and apply coil current in the desired direction. Two pushbutton switches provide this facility. When both switches are open the sensor will cause the assembly to seek the nearest detent position.

The embodiments described herein use permanent magnets in various arrangements. Electromagnets could be substituted for any permanent magnets used.

DETAILED DESCRIPTION

Figure 1:
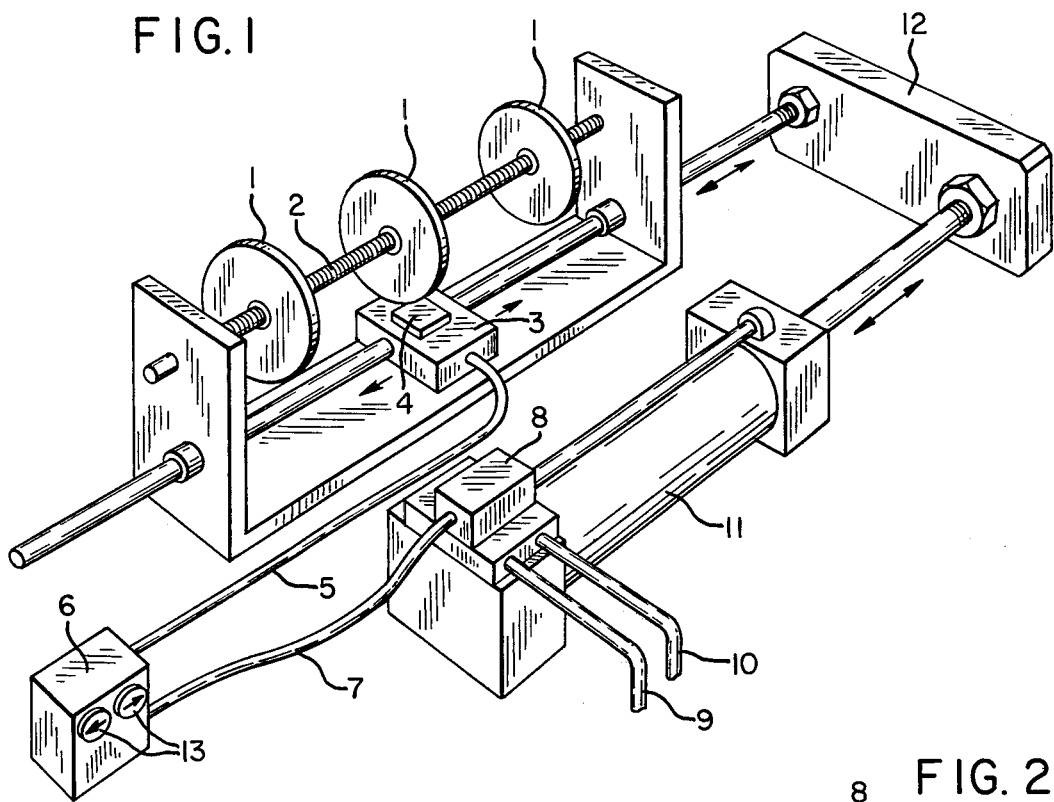
FIG. 1 shows the preferred embodiment of the load positioner.

FIG. 1 shows a preferred embodiment of my invention. For clarity only three magnets (1) are shown. Any number of magnets can be used. These are ceramic magnets with their magnetic axis across the narrow dimension of the material as is usual with ceramic magnets. Each magnet is drilled through the center for mounting on a threaded non-magnetic rod (2). The non-magnetic rod can be of brass or stainless steel. The magnetic axis of the magnets is along the axis of the mounting rod, and each magnet is oriented so that they all have the same magnetic polarity. On a carriage (3) that can traverse linearly under the magnets (1), there is mounted a magnetic sensor (4) of the Hall effect type. Four wires (5) connect the sensor (4) to the differential amplifier (6). Two of these wires carry the current required to operate the Hall element (4), and two wires return the voltage that is developed by the Hall element when it is subjected to magnet field.

The amplifier (6) raises the magnitude of the voltage signals obtained from the Hall sensor. The signal voltages are then applied to a differential amplifier which produces a bipolar current signal that exhibits a null, or zero value, when the sensor is passing through the position at which the incident magnetic field is reversing direction. Two wires (7) carry this bipolar current to the proportional valve (8). The valve (8) is supplied with a source (9) of hydraulic oil at high pressure, and is provided with a sink (10) for return of low pressure oil. The valve (8) controls the oil flow into the ends of the hydraulic cylinder (11). When electric current through the valve coil is positive, the piston in the cylinder will extend at a rate proportional to the magnitude of the electric current. When electric current through the valve coil is negative, the piston will retract at a rate proportional to the magnitude of the electric current. The load (12) and therefore the sensor (4) will thus move whenever the valve coil current is nonzero. That condition will prevail until the sensor (4) and therefore the load (12) occupy a null or detent position as defined by the location of a magnet (1).

Stability of the detent is secured by orienting all magnets so as to have the same polarity, and also by reversing connection, if necessary, of the two wires connected to the valve coil.

Relocation of the load from one detent to another is provided by two switches (13). A switch simply overrides the signal from the Hall sensor and drives current into the valve coil in a selected direction, either positive or negative.

Figure 2:
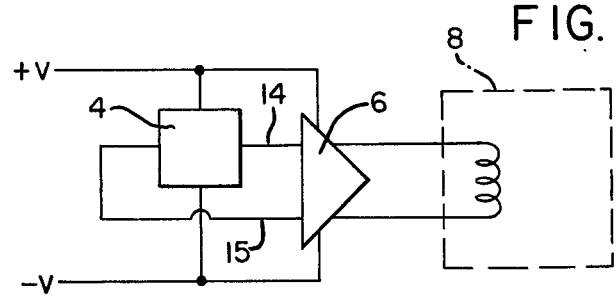
FIG. 2 is a schematic diagram of the electrical circuit by which the Hall generator is connected to the valve.
Figure 3:
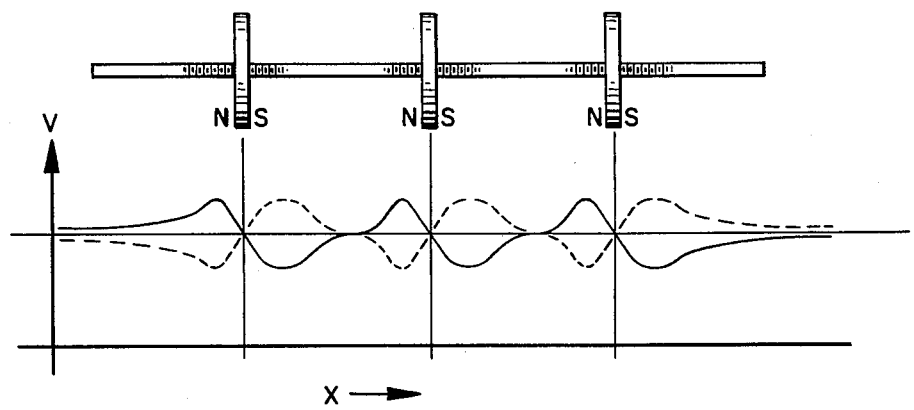
FIG. 3 illustrates how the Hall voltages are a function of sensor position.

FIG. 2 is a schematic diagram of the electrical circuit by which the Hall generator is connected to the proportional hydraulic valve. The Hall generator (4) is connected to a source and sink for electric current, and its voltage output signal lines (14) and (15) are connected to a differential amplifier (6). The Hall voltages on lines (14) and (15) are illustrated as a function of sensor position in FIG. 3. The solid curve in FIG. 3 represents the voltage on Hall generator lead (14), while the dashed curve in FIG. 3 represents the voltage on Hall generator lead (15). The differential amplifier (6) drives through the valve coil (8) an electric current that is algebraically proportional to the difference between the voltage on lead (14) and the voltage on lead (15).

To set up the Linear Indexer for operation, it is sufficient to position the magnets on their holding rod at the desired detent locations. Nonmagnetic nuts and flat washers can be used to fix the magnets in desired positions.

Figure 4:
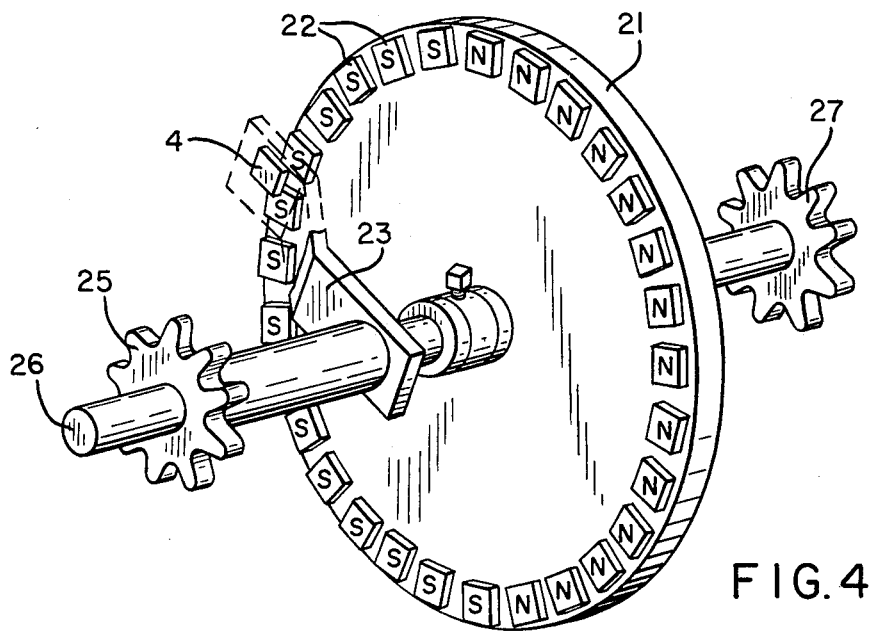
FIG. 4 illustrates another embodiment utilizing a circular disk.

FIG. 4 shows another embodiment of my invention. A circular disk (21) of nonmagnetic material such as aluminum, is fixed to a shaft (26) and to a sprocket (27). The sprocket (27) is driven by a hydraulic motor which for clarity is not shown. The motor is controlled by a proportional hydraulic valve. The valve is controlled by the Hall sensor (4) through a differential amplifier identical to that shown in FIG. 2.

The Hall sensor (4) is fixed to an arm (23). Arm (23) is fixed to sprocket (25). The arm and sprocket assembly (23,25) is free to rotate on shaft (26). The Hall sensor (4) is positioned on the arm (23) so as to face the closely spaced magnets (22) that are attached to the disk (21).

The magnets along half of the periphery of the disk have their South poles facing the sensor; the magnets along the other half of the periphery have their North poles facing the sensor. There is thus created two discontinuities in magnet orientation and reversals in magnetic field polarity of the field incident upon the sensor (4) as the disk (21) rotates. One of these discontinuities creates a stable detent. The determination of which of the two discontinuities creates the stable detent is invertable by reversing the valve coil connections.

Under the influence of sensor (4) the motor will drive sprocket (27) and disk (21) until the stable discontinuity is positioned at the location of the sensor (4). Via sprocket (25) the sensor (4) is connected to a machine element whose position is to be duplicated or tracked by the hydraulic motor driving sprocket (27). By chain connecting a shifting bandsaw, for example, to sprocket (25), and thus to sensor (4), this embodiment has been applied to cause an edging-picker knife, driven by the motor connected to sprocket (27), to track the position of the shifting bandsaw.

Figure 5:
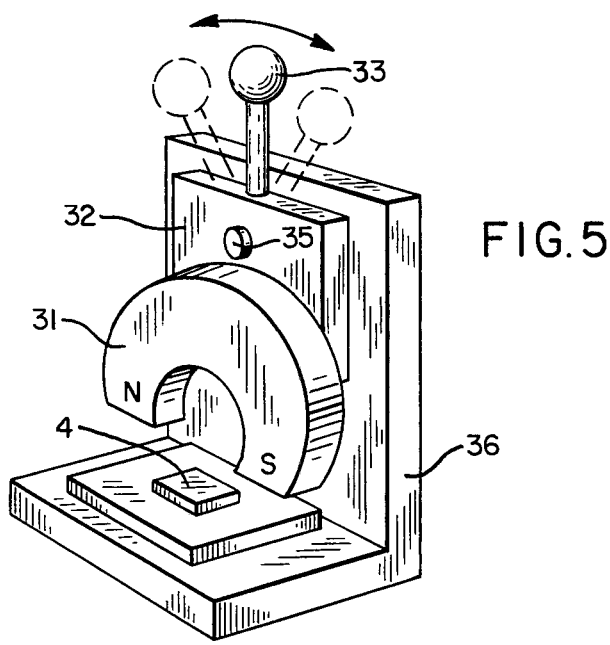
FIG. 5 illustrates an embodiment utilizing a bar magnet or horseshoe magnet.

FIG. 5 shows yet another embodiment or application of my invention. A magnet (31) which can be either a bar magnet or a horseshoe magnet, is fixed to a nonmagnetic bracket (32). The bracket (32) is fixed to a handle (33), and the assembly (31,32,33) is pivotally connected by a pin or bolt (35) to a suitable base (36). A Hall sensor (4) is fixed to the base (36) such that motion of the handle (33) causes variation of the magnetic field incident upon the sensor (4). The sensor (4) is connected to a differential amplifier identical to that used in the preferred embodiment, and shown in FIG. 2. The control handle thus constructed can be used to manually control any type of hydraulic cylinder or motor. This control handle offers significant advantages over the potentiometer type control handles used in the current practice. It can be constructed to be durable under adverse conditions; it includes no exposed electrical conductors, and it has no moving electrical contacts. Also, the shape of the magnet can be tailored to produce within limits a specified smooth transfer function relating handle position to voltage output.

Addition of elastic restraint to the handle assembly (32,33) will create a form of force transducer known as a "load cell." The electrical signal voltage output from the Hall generator (4) will be a function of the load or force applied to the handle (33). Indeed, any embodiment disclosed herein can be converted into a load cell or force transducer by inclusion of a spring to provide elastic restraint on the relative displacement between sensor and magnet.

Figure 6:
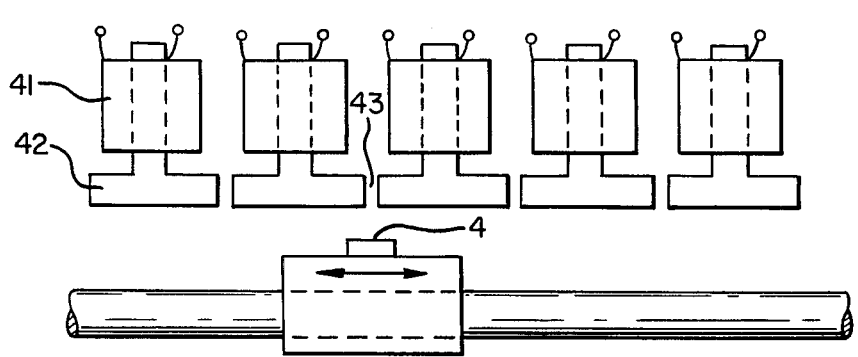
FIG. 6 illustrates an embodiment utilizing electromagnets instead of permanent magnets.

FIG. 6 shows schematically a variation of the preferred embodiment shown in FIG. 1. Electromagnets are used instead of permanent magnets. Each electromagnet consists of a coil (41) and a polepiece (42). By routing electric current in a positive direction through all coils to the left of air gap (43), for example, and in a negative direction through all coils to the right of air gap (43), the Hall sensor (4) defines a switch selectable air gap to be the sole detent position sought.

Having described my invention, what I claim is:
1. A linear positioner comprising:
 a. a plurality of magnets arranged to create a magnetic field exhibiting one or more discrete regions of direction reversal along the path of
 b. a Hall effect magnetic field sensor,
 c. means for amplification of the original sensor electrical voltage signals,
 d. means for differential combination of said original voltage signals to yield a bipolar current signal exhibiting a null whenever said original voltage signals are of equal sense and magnitude,
 e. means for imparting motion upon said sensor relative to said magnets at a rate proportional to said current, so that said sensor seeks a position where the absolute value of said current is zero; thereby establishing a plurality of discrete preferred positions maintainable under disturbance without external assistance, but including
 f. means for temporarily overriding said current so as to relocate the position of said sensor from one said preferred position to another said preferred position.

2. A linear positioner comprising:
 a. a plurality of electromagnets arranged to create a magnetic field exhibiting a selectable discrete region of direction reversal along the path of
 b. a Hall effect magnetic sensor,
 c. means for amplification of the original sensor electrical voltage signals,
 d. means for differential combination of said original voltage signals to yield a bipolar current signal exhibiting a null whenever said original voltage signals are of equal sense and magnitude,
 e. means for imparting motion upon said sensor relative to said electromagnets at a rate proportional to said current, so that said sensor seeks a position where the absolute value of said current is zero; thereby establishing a plurality of selectable discrete preferred positions maintainable under disturbance without external assistance, but including
 f. means for selectively reversing the polarity of said electromagnets so as to relocate the position of said sensor from one said preferred position to another said preferred position.

* * * * *